(12) United States Patent
Nair

(10) Patent No.: US 11,667,109 B2
(45) Date of Patent: Jun. 6, 2023

(54) RECYCLABLE PACKAGING MATERIAL AND PROCESS OF PREPARATION THEREOF

(71) Applicant: Hariharan Krishnan Nair, Mumbai (IN)

(72) Inventor: Hariharan Krishnan Nair, Mumbai (IN)

(*) Notice: Subject to any disclaimer, the term of this patent is extended or adjusted under 35 U.S.C. 154(b) by 0 days.

(21) Appl. No.: 17/471,559

(22) Filed: Sep. 10, 2021

(65) Prior Publication Data

US 2022/0072834 A1 Mar. 10, 2022

(30) Foreign Application Priority Data

Sep. 10, 2020 (IN) .............................. 202021039242

(51) Int. Cl.
*B32B 27/08* (2006.01)
*B32B 27/20* (2006.01)
(Continued)

(52) U.S. Cl.
CPC .......... *B32B 27/08* (2013.01); *B29C 48/0018* (2019.02); *B29C 48/0021* (2019.02);
(Continued)

(58) Field of Classification Search
CPC ............ B32B 27/08; B32B 1/08; B32B 7/12; B32B 27/20; B32B 27/306; B32B 27/32; B32B 37/16; B32B 2250/05; B32B 2250/24; B32B 2250/246; B32B 2270/00; B32B 2307/41; B32B 2307/412; B32B 2307/54; B32B 2307/72; B32B 2307/7244; B32B 2307/75; B32B 2553/00; B32B 2597/00; Y10T 428/1334; Y10T 428/1352; Y10T 428/1379; Y10T 428/1383; Y10T 428/139; B29C 48/0018; B29C 48/0021;
(Continued)

(56) References Cited

U.S. PATENT DOCUMENTS 6,146,726 A * 11/2000 Yoshii ..................... B32B 27/08
428/35.9
8,978,346 B2 3/2015 Breck
(Continued)

FOREIGN PATENT DOCUMENTS

CN 1760087 A 4/2006
WO 2008079755 A2 7/2008
(Continued)

OTHER PUBLICATIONS

First Examination Report issued in the corresponding Indian Patent Application No. 202021039242, dated Nov. 8, 2021 in 6 pages.
(Continued)

*Primary Examiner* — James C Yager
(74) *Attorney, Agent, or Firm* — Knobbe, Martens, Olson & Bear, LLP

(57) ABSTRACT

A recyclable article includes 50-90 wt % of at least one polyethylene having a density in the range 0.94 to 0.97 g/cm³. The article exhibits Young's modulus less than 700 MPa; and a haze value less than or equal to 50%. The recyclable article can be included in a film or a laminate. The article can be prepared using a blown film extrusion process.

20 Claims, 1 Drawing Sheet

(51) Int. Cl.
| | | |
|---|---|---|
| *B32B 1/08* | (2006.01) | |
| *B32B 27/30* | (2006.01) | |
| *B65D 65/40* | (2006.01) | |
| *B32B 7/12* | (2006.01) | |
| *B29C 48/00* | (2019.01) | |
| *B29C 48/88* | (2019.01) | |
| *B32B 37/16* | (2006.01) | |
| *B32B 27/32* | (2006.01) | |
| *B29L 23/00* | (2006.01) | |

(52) U.S. Cl.
CPC .......... *B29C 48/022* (2019.02); *B29C 48/912* (2019.02); *B32B 1/08* (2013.01); *B32B 7/12* (2013.01); *B32B 27/20* (2013.01); *B32B 27/306* (2013.01); *B32B 27/32* (2013.01); *B32B 37/16* (2013.01); *B65D 65/40* (2013.01); *B29K 2023/06* (2013.01); *B29L 2023/001* (2013.01); *B32B 2250/05* (2013.01); *B32B 2250/24* (2013.01); *B32B 2250/246* (2013.01); *B32B 2270/00* (2013.01); *B32B 2307/41* (2013.01); *B32B 2307/412* (2013.01); *B32B 2307/54* (2013.01); *B32B 2307/72* (2013.01); *B32B 2307/7244* (2013.01); *B32B 2307/75* (2013.01); *B32B 2553/00* (2013.01); *B32B 2597/00* (2013.01); *Y10T 428/139* (2015.01); *Y10T 428/1334* (2015.01); *Y10T 428/1352* (2015.01); *Y10T 428/1379* (2015.01); *Y10T 428/1383* (2015.01)

(58) Field of Classification Search
CPC ..... B29C 48/022; B29C 48/912; B65D 65/40; B29K 2023/06; B29L 2023/001
See application file for complete search history.

(56) References Cited

U.S. PATENT DOCUMENTS

| | | |
|---|---|---|
| 9,126,269 B2 | 9/2015 | Ohlsson et al. |
| 2012/0028017 A1* | 2/2012 | Saraf ...................... B32B 27/32 |
| | | 428/218 |

FOREIGN PATENT DOCUMENTS

| | | |
|---|---|---|
| WO | 2010002837 A1 | 1/2010 |
| WO | 2010039687 A1 | 4/2010 |

OTHER PUBLICATIONS

International Search Report issued for International Patent Application No. PCT/IN2021/050884, dated Dec. 6, 2021 in 3 pages.

* cited by examiner

RECYCLABLE PACKAGING MATERIAL AND PROCESS OF PREPARATION THEREOF

CROSS-REFERENCE TO RELATED APPLICATION

This application claims priority to Indian Patent Application No. 202021039242 filed on Sep. 10, 2020, the disclosure of which including the specification, the drawings, and the claims is hereby incorporated by reference in its entirety.

FIELD OF INVENTION

The subject matter disclosed herein relates to the field of packaging materials and in particular relates to recyclable packaging material for use in manufacturing packaging articles.

BACKGROUND OF THE INVENTION

With a rapid increase in demand for quality products, the packaging industry has emerged as one of the most fastest growing sector in the world's economy. According to a research done by Smithers, the global packaging market is estimated to expand by approximately 3% per annum by 2028, reaching over $1.2 trillion (The Future of Packaging: Long-Term Strategic Forecast to 2028).

There are various packaging material options available in the market, such as glass, cardboard, paper, and metal, but one of the most commonly used plastic and polyethylene packaging material occupies a large volume of it. Derived from petroleum source, polyethylene (PE) is highly advantageous in terms of being most durable, extremely lightweight and low in cost as compared with other plastics. However, like other synthetic plastics, PE is non-biodegradable and thus accumulates in the landfill sites as plastic debris that is creating a serious threat to environmental health and safety.

Many types of polyethylene, for example, low-density polyethylene (LDPE), medium-density polyethylene (MDPE), high-density polyethylene (HDPE), and the like, are known that are used in packaging variety of food, cosmetics and other daily use products. HDPE has benefits of high tensile strength but lacks transparency. Therefore, it finds applications in packaging products like industrial chemicals and water pipes that are opaque but have considerable amount of stiffness. On the other hand, LDPE due to its flexibility and relative transparency is more popular in manufacturing flexible lids, bottles, as well as plastic bags and films. CN1760087A discloses a packaging film material of multilayer composite prepared from 5 film layers through coextruding, wherein each of 5 film layers contains 2-3 of low-density polyethylene (LDPE), linear low-density polyethylene (LLDPE), polyvinylidene chloride (PVDC), ethylene vinyl acetate (EVA) and metallocene polyethylene.

Aluminum barrier laminated tubes (ABL) and polymer barrier laminated (PBL) tubes are also used for packaging oral, pharma, cosmetics, and home care formulations. With the increased usage of these tubes, the focus on recyclability is also going up. Since the ABL tubes suffer disadvantages such as non-recyclability and lack of transparency, we see a trend in shift from ABL to PBL for improving the recyclability and transparency. In a traditional PBL tube, the polymer blend is made up of LDPE, LLDPE, MDPE, and HDPE, other than the barrier layer and pigments. However, as the trend is moving towards mono materials, the effort is to maximize the usage of polymers like polypropylene and HDPE and to minimize the barrier layer in the total formulation to promote recyclability of the tubes in the respective streams eg., HDPE stream and also to improve the clarity of the tubes while maintaining the required stiffness and recyclability. Thus, there is a dire need in the present state of the art to develop a packaging film that fulfills above mentioned aspects.

SUMMARY OF THE INVENTION

In a first aspect of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 50%.

In a second aspect of the present disclosure, there is provided a process of preparation of the recyclable article as film as described herein, the process comprising: (a) melting the at least one polyethylene to obtain a polyethylene melt stream; (b) extruding the polyethylene melt in downward stream from an annular die to obtain an extruded material; (c) inflating the extruded material to obtain blown film bubble; and (d) quenching the blown film bubble with chilled water to obtain the recyclable article as film.

In a third aspect of the present disclosure, there is provided a process of preparation of the recyclable article as laminate as described herein, the process comprising: (a) obtaining at least one film by the process comprising: (1) melting the at least one polyethylene to obtain a polyethylene melt stream; (2) extruding the polyethylene melt in downward stream from an annular die to obtain an extruded material; (3) inflating the extruded material to obtain blown film bubble; and (4) quenching the blown film bubble with chilled water to obtain the recyclable article as film; (b) obtaining at least one extrusion lamination layer or adhesive lamination layer; and (c) laminating the at least two films and the at least one extrusion/adhesive lamination layer to obtain a recyclable article as laminate.

In a fourth aspect of the present disclosure, there is provided a use of the article as described herein for a packaging material, wherein the packaging material is laminitube, shoulder barrier liner, or inner barrier liner.

These and other features, aspects, and advantages of the present subject matter will be better understood with reference to the following description. This summary is provided to introduce a selection of concepts in a simplified form. This summary is not intended to identify key features or essential features of the claimed subject matter.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE INVENTION

Figure 1:
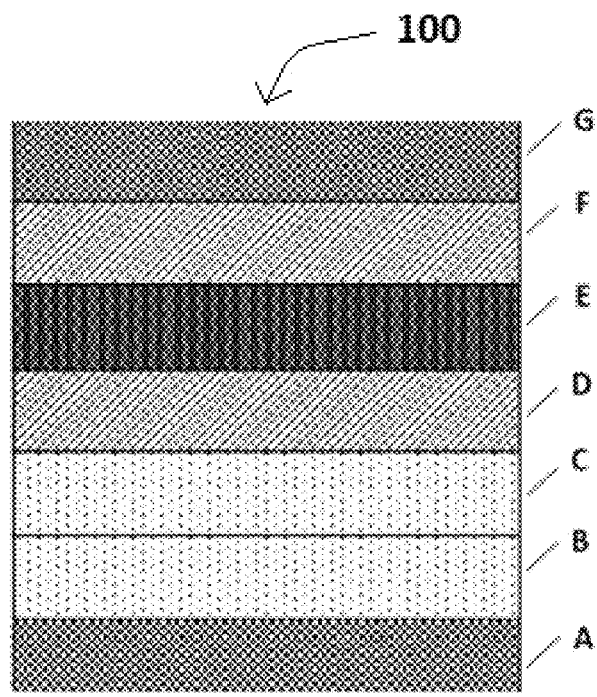
FIG. 1 illustrates a cross-section of a seven-layer barrier film-1 and barrier film-2 (100), according to an implementation of the present disclosure.

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "at least one" used herein refers to one or more and thus, includes individual components as well as mixtures/combinations.

The phrase "at least one polyethylene having a density in the range 0.94 to 0.97 g/cm$^3$" as used herein refers to any polyethylene having density in the range of 0.94 to 0.97 g/cm$^3$, wherein the polyethylene may also include modified polyethylene(s), such as metal-modified polyethylene, chemically modified polyethylene, fiber modified polyethylene and the like.

The phrases "high-density polyethylene", "medium-density polyethylene", "low-density polyethylene", and "linear low-density polyethylene" as used herein refers to polyethylene having densities well known to the person skilled in the art.

The term "extrusion lamination" used herein refers to a process in which two or more packaging films are joined together by a molten resin extruded in film shape placed in between the two packaging films. The molten resin thus acts as a bonding agent and may be selected from high-density polyethylene, low-density polyethylene, linear low-density polyethylene, medium-density polyethylene, modified polyethylene eg., maleated polyethylene, or combinations thereof.

The term "adhesive lamination" used herein refers to a process in which two or more packaging films are joined together using an adhesive, for example, polyurethane.

The term "lamitube" used herein refers to laminated tubes widely used for packaging cosmetic material, toothpaste, and other viscous food products.

The term "film" used herein refers to single layer or multilayer wall between the packaged product and the surrounding environment, wherein the layer comprises at least one polyethylene is selected from high-density polyethylene, medium-density polyethylene, or combinations thereof.

The term "laminate" used herein refers to a wall between the packaged product and the surrounding environment comprising at least two films with or without an extrusion/adhesive lamination layer.

The term "UV blocking agent" used herein refers to a chemical compound that is capable of blocking or absorbing UV radiations.

The term "pigment" used herein refers to a colored substance.

The term "functional masterbatch" used herein refers to additives that are used to impart special properties or functionalities to plastics.

The term "sealant" used herein refers to a layer generally present on the inside of a packaging film to heat seal and moisture seal the contents of the packaged product.

The term "blocked" used herein refers to sticking of the blown film bubble without an extrusion lamination layer or adhesive lamination layer in between during the collapsing stage of the bubble in the blown film extrusion process, thus making a film with twice the thickness of the bubble film layer.

The term "printable layer" used herein refers to the layer that may be printed and may or may not comes in contact with the surrounding environment, with no limitations on its positioning at the inside (inner layer) or outside (outer layer) in the recyclable article produced therefrom. The printable layer may also be treated as the sealant layer that comes in contact with the packaged material.

The term "sealant layer" used herein refers to the layer that comes in contact with the packaged material, with no limitations on its positioning at the inside (inner layer) or outside (outer layer) in the recyclable article produced therefrom. The sealant layer may also be treated as the printable layer that comes in contact with the surrounding environment.

The term "Young's modulus" used herein refers to a measure of a solid's stiffness or resistance to elastic deformation under load. It relates stress (force per unit area) to strain (proportional deformation) along an axis or line. In the present disclosure the Young's modulus of the packaging material such as the films, laminates, or the articles made therefrom are measured and was found to be less than 700 MPa (Z score<2). Young's modulus is measured in machine direction (MD) and in transverse direction (TD).

The term "haze value" used herein refers to measure of the haziness of the sample and is described as the amount of light scattered (large scale deflection) with respect to the amount of light that gets transmitted. The lower the haze measurement value, the higher the clarity of the sample indicating better viewability. Haze is the percentage of light which passing through deviates from the incident beam greater than 2.5 degree on the average. Haze value is calculated using the Formula Td/Tt (Scattered light which is greater than 2.5 degree (Td)/Total transmitted light (Tt)). In the present disclosure, the haze value of the film, laminate or the articles are less than 50% which indicated the higher transparency of the material.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of 50 µm to 520 µm should be interpreted to include not only the explicitly recited limits of 50 µm to 520 µm, but also to include sub-ranges, such as 65 µm to 450 µm, 85 µm to 360 µm, and so forth, as well as individual amounts, including fractional amounts, within the specified ranges, such as 90 µm, 140 µm, and 250 µm, for example.

As discussed in the background, the high-density polyethylene imparts high strength and rigidity but due to its high crystallinity as compared to other PE types, it lacks transparency and softness, which is much required to attract the customers towards the product by improving the aesthesis and feel of packaging. Although HDPE enables down gauging to some extent, but the packaging tubes made of HDPE are very stiff and inconvenient to use. Generally, upward blown film extrusion process is used for making mono and multi-layer films. The alternative methods available for making films include cast film and thermally quenched film by downward extrusion methods.

Depending upon the malleability, polyethylene can be pressed, cast or extruded into variety of shapes. Extrusion process is one of the processes most widely used to make polyethylene into films, bottles and tubes. For making films, blown film process is used and it starts from feeding a plastic material from a hopper into an extruder wherein the plastic material is heated to form a melt. This melt form of plastic is forced to pass through a circular-shaped die that yields a semi-solid tube whose diameter is expanded by blowing air through the die. The film is cooled using either air or water to crystallize it. Further, several nip rollers flatten it to form rolls of sheeting. The film can be extruded in upward, downward and horizontal directions and the rate of extrusion and blowing can be controlled to achieve desired strength, gloss and haze of the extruded film. The upward blown film process is typically being used for making transparent films for transparent thermoforming web applications. Since, the current applications target is to obtain a very high transparency, the polyethylene is therefore limited to low-density polyethylene with minor blends of HDPE. However, increased content of LDPE renders the HDPE film non-recyclable in the HDPE recycle streams and poses several challenges in recycling.

In view of the above, the present disclosure aims to provide an environmental-friendly packaging material comprising a major portion of high-density polyethylene or medium density polyethylene. It addresses the need for improving clarity of tubes by replacing the traditional upward blown film extrusion with downward blown film extrusion process and shifting to HDPE/MDPE based films, which improves the clarity of the article and also meets the requirements of recycling in specific codes without loss of clarity. At the same time, the article made with the majority of HDPE/MDPE using downward extrusion will also be softer as compared to articles made with the prevalent upward blown film technology. This will improve the feel of the package.

The present disclosure thus provides a recyclable packaging article comprising 50-90 wt % of at least one polyethylene having a density in the range 0.94 to 0.97 g/cm$^3$. The polyethylene is majorly high-density polyethylene and the resulting article which can either be a laminate or a film, exhibiting Young's modulus of less than 700 MPa. Thus, an article having the films or laminates comprising HDPE/MDPE shows good tensile properties, stiffness, and are also elastic and soft in nature at the same time. Moreover, since HDPE, MDPE and their combinations can be recycled in established bottle grade recycling streams and in other recyclability streams, and thereby increasing its content in packaging helps to decrease the environmental damage. Reduction in the barrier layer≤10% also makes sure the packaging material is recyclable in the respective recycling stream. The article of the present disclosure, made by downward extrusion process are transparent≤50% of haze which makes them a potential candidate to replace the commercially used less clarity upward blown films. Further, in view of the several existing environmental problems, the packaging material made using environmental friendly recyclable article of the present disclosure have a strong market potential in the long term.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 50%.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 500 MPa; and a haze value less than or equal to 50%.

In an embodiment of the present disclosure, the article exhibits a haze value less than 40%. In another embodiment of the present disclosure, the article exhibits a haze value less than 35%. In yet another embodiment of the present disclosure, the article exhibits a haze value less than 30%. In yet another embodiment of the present disclosure, the article exhibits a haze value less than 26%.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 40%. In another embodiment of the present disclosure, wherein the article exhibits Young's modulus less than 700 MPa; and a haze value less than or equal to 35%. In one another embodiment of the present disclosure, wherein the article exhibits Young's modulus less than 700 MPa; and a haze value less than or equal to 30%. In more embodiment of the present disclosure, wherein the article exhibits Young's modulus less than 700 MPa; and a haze value less than or equal to 26%.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 500 MPa; and a haze value less than or equal to 40%. In another embodiment of the present disclosure, wherein the article exhibits Young's modulus less than 500 MPa; and a haze value less than or equal to 35%. In one another embodiment of the present disclosure, wherein the article exhibits Young's modulus less than 500 MPa; and a haze value less than or equal to 30%. In more embodiment of the present disclosure, wherein the article exhibits Young's modulus less than 500 MPa; and a haze value less than or equal to 26%.

In an embodiment of the present disclosure, there is provided a recyclable article as described herein, wherein the article is a film or a laminate. In another embodiment of the present disclosure, wherein the article is a film. In yet another embodiment of the present disclosure, wherein the article is a laminate.

In an embodiment of the present disclosure, there is provided a recyclable article as described herein, wherein the article is a multilayer film having 3-11 layers. In another embodiment of the present disclosure, the article is a multilayer film having 4-8 layers. In yet another embodiment of the present disclosure, the article is a multilayer film having 5-7 layers.

In an embodiment of the present disclosure, there is provided a recyclable article as described herein, wherein the at least one polyethylene is selected from high-density polyethylene, medium-density polyethylene, or combinations thereof. In another embodiment of the present disclosure, wherein the at least one polyethylene is high-density polyethylene. In yet another embodiment of the present disclosure, wherein the at least one polyethylene is medium-density polyethylene.

In an embodiment of the present disclosure, there is provided a recyclable article as described herein, wherein the article further comprises one or more components selected from high-density polyethylene, low-density polyethylene, linear low-density polyethylene, and medium-density polyethylene.

In an embodiment of the present disclosure, there is provided a recyclable article as described herein, wherein the article optionally comprises UV blocking agent, pigment, functional masterbatch, or combinations thereof.

In an embodiment of the present disclosure, there is provided a recyclable article comprising: 50-90 wt % of at least one polyethylene selected from high-density polyethylene, medium-density polyethylene, or combinations thereof, wherein the article exhibits Young's modulus less than 700 MPa and a haze value less than or equal to 50%, the article further comprises one or more components selected from high-density polyethylene, low-density polyethylene, linear low-density polyethylene, medium-density polyethylene and optionally UV blocking agent, pigment, functional masterbatch, or combinations thereof.

In an embodiment of the present disclosure, there is provided a recyclable article comprising: 50-90 wt % of at least one polyethylene selected from high-density polyethylene, medium-density polyethylene, or combinations thereof, wherein the article exhibits Young's modulus less than 500 MPa and a haze value less than or equal to 50%, the article further comprises one or more components selected from high-density polyethylene, low-density polyethylene, linear low-density polyethylene, medium-density polyethylene and optionally UV blocking agent, pigment, functional masterbatch, or combinations thereof.

In an embodiment of the present disclosure, there is provided a recyclable article as described herein, wherein the article comprises 60-70 wt % of the at least one polyethylene.

In an embodiment of the present disclosure, there is provided a recyclable article as described herein, wherein the article comprises 60-70 wt % of the at least one polyethylene selected from high-density polyethylene, medium-density polyethylene, or combinations thereof.

In an embodiment of the present disclosure, there is provided a recyclable article as described herein, wherein the article has a thickness in the range of 50 µm to 520 µm. In another embodiment of the present disclosure, the article has a thickness in the range of 90 µm to 450 µm. In yet another embodiment of the present disclosure, the article has a thickness in the range of 90 µm to 350 µm.

In an embodiment of the present disclosure, there is provided a recyclable article as described herein, wherein the article has a thickness in the range of 200 µm to 350 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 50%; and the article has a thickness in the range of 50 µm to 520 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 50%; and the article has a thickness in the range of 90 µm to 350 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 50%; and the article has a thickness in the range of 200 µm to 350 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 500 MPa; and a haze value less than or equal to 50%; and the article has a thickness in the range of 50 µm to 520 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 500 MPa; and a haze value less than or equal to 50%; and the article has a thickness in the range of 90 µm to 350 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 500 MPa; and a haze value less than or equal to 50%; and the article has a thickness in the range of 200 µm to 350 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 35%; and the article has a thickness in the range of 50 µm to 520 µm.

In an embodiment of the present disclosure, there is provided a recyclable article comprising: 50-90 wt % of at least one polyethylene having a density in the range 0.94 to 0.97 g/cm$^3$, wherein the article exhibits Young's modulus less than 700 MPa; and a haze value less than or equal to 35%; and the article has a thickness in the range of 90 μm to 350 μm.

In an embodiment of the present disclosure, there is provided a recyclable article comprising: 50-90 wt % of at least one polyethylene having a density in the range 0.94 to 0.97 g/cm³, wherein the article exhibits Young's modulus less than 700 MPa; and a haze value less than or equal to 35%; and the article has a thickness in the range of 200 μm to 350 μm.

In an embodiment of the present disclosure, there is provided a recyclable article comprising: 50-90 wt % of at least one polyethylene having a density in the range 0.94 to 0.97 g/cm³, wherein the article exhibits Young's modulus less than 500 MPa; and a haze value less than or equal to 35%; and the article has a thickness in the range of 50 μm to 520 μm.

In an embodiment of the present disclosure, there is provided a recyclable article comprising: 50-90 wt % of at least one polyethylene having a density in the range 0.94 to 0.97 g/cm³, wherein the article exhibits Young's modulus less than 500 MPa; and a haze value less than or equal to 35%; and the article has a thickness in the range of 90 μm to 350 μm In an embodiment of the present disclosure, there is provided a recyclable article comprising: 50-90 wt % of at least one polyethylene having a density in the range 0.94 to 0.97 g/cm³, wherein the article exhibits Young's modulus less than 500 MPa; and a haze value less than or equal to 35%; and the article has a thickness in the range of 200 μm to 350 μm.

In an embodiment of the present disclosure, there is provided a recyclable article as described herein, wherein the article is a film made by blown film extrusion process.

In an embodiment of the present disclosure, there is provided a recyclable article as described herein, wherein the article is a film made by downward blown film extrusion process.

In an embodiment of the present disclosure, there is provided a recyclable article as described herein, wherein the article is a film made by downward extrusion blown film extrusion process comprising the at least one polyethylene having a density in the range of 0.94 to 0.97 g/cm³, wherein the article exhibits Young's modulus less than 700 MPa; and a haze value less than or equal to 50%.

In an embodiment of the present disclosure, there is provided a recyclable article as described herein, wherein the article is a film made by downward extrusion blown film extrusion process comprising the at least one polyethylene having a density in the range of 0.94 to 0.97 g/cm³, wherein the article exhibits Young's modulus less than 500 MPa; and a haze value less than or equal to 50%.

In an embodiment of the present disclosure, there is provided a recyclable article as described herein, wherein the article is a film having 5-7 layers made by downward extrusion blown film process comprising the at least one polyethylene having a density in the range of 0.94 to 0.97 g/cm³.

In an embodiment of the present disclosure, there is provided a recyclable article as described herein, wherein the article is a film comprising: at least one printable layer; at least one first tie layer; at least one barrier layer; at least one second tie layer; and at least one sealant layer, and wherein the article exhibits Young's modulus less than 700 MPa; and a haze value in the range of 10-50%.

In an embodiment of the present disclosure, there is provided a recyclable article as described herein, wherein the article is a film comprising: at least one printable layer; at least one first tie layer; at least one barrier layer; at least one second tie layer; and at least one sealant layer, and wherein the article exhibits Young's modulus less than 500 MPa; and a haze value in the range of 10-50%.

In an embodiment of the present disclosure, there is provided a recyclable article as described herein, wherein the article is a film comprising: at least one printable layer; at least one first tie layer; at least one barrier layer; at least one second tie layer; and at least one sealant layer, and wherein the article exhibits Young's modulus less than 700 MPa, and wherein the printable layer is an outer layer and the sealant layer is an inner layer. In another embodiment of the present disclosure, the printable layer is an inner layer and the sealant layer is an outer layer.

In an embodiment of the present disclosure, there is provided a recyclable article, wherein the article is a film as described herein, and the article exhibits a haze value in the range of 10-50%.

In an embodiment of the present disclosure, there is provided a recyclable article, wherein the article is a film as described herein, and the at least one printable layer and the at least one sealant layer is selected from high-density polyethylene, low-density polyethylene, linear low-density, medium-density polyethylene or combinations thereof.

In an embodiment of the present disclosure, there is provided a recyclable article, wherein the article is a film as described herein, and the at least one barrier layer is less than 10% by weight of the total film, preferably less than 5% by weight of the total film.

In an embodiment of the present disclosure, there is provided a recyclable article, wherein the article is a film as described herein, and the at least one barrier layer is selected from ethylene vinyl alcohol, polyamides, polyethylene terephthalate, or combinations thereof. In another embodiment of the present disclosure, the at least one barrier layer is ethylene vinyl alcohol.

In an embodiment of the present disclosure, there is provided a recyclable article, wherein the article is a film as described herein, and the at least one first tie layer and the at least one second tie layer independently comprises a polymeric adhesive selected from the group consisting of maleated polyethylene, anhydride grafted ethylene/1-butene copolymer, anhydride grafted ethylene/1-hexene copolymer, propylene ethylene copolymer, ethylene vinyl acetate copolymer, ethylene methyl acrylate copolymer, anhydride grafted ethylene/1-octene copolymer, modified polypropylene, maleated polypropylene, and combinations thereof.

In an embodiment of the present disclosure, there is provided a recyclable article, wherein the article is a film as described herein, and the film has at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 50 μm to 260 μm. In another embodiment of the present disclosure, the film has thickness in the range of 90 μm to 250 μm.

In an embodiment of the present disclosure, there is provided a recyclable article, wherein the article is a film as described herein, and the film has at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 90 to 350 μm. For the purpose of this embodiment, the first and second tie layer is maleated polyethylene, the printable layer and the sealant layer is a combination of high-density polyethylene, medium-density polyethylene and low-density polyethylene, and the barrier layer is ethylene vinyl alcohol.

In an embodiment of the present disclosure, there is provided a recyclable article, wherein the article is a film as described herein, and the film can be blocked during a blown film extrusion process having thickness in the range of 100 μm to 520 μm.

In an embodiment of the present disclosure, there is provided a recyclable article as described herein, wherein the article is a film comprising: at least one printable layer is selected from high-density polyethylene, medium-density polyethylene, low-density polyethylene, or combinations thereof; at least one first tie layer is maleated polyethylene; at least one barrier layer is ethylene vinyl alcohol; at least one second tie layer is maleated polyethylene; and at least one sealant layer is is selected from high-density polyethylene, medium-density polyethylene, low-density polyethylene, or combinations thereof, and the article exhibits Young's modulus less than 700 MPa.

In an embodiment of the present disclosure, there is provided a recyclable article as described herein, wherein the article is a film comprising: at least one printable layer is selected from medium-density polyethylene, low-density polyethylene, or combinations thereof; at least one first tie layer is maleated polyethylene; at least one barrier layer is ethylene vinyl alcohol; at least one second tie layer is maleated polyethylene; and at least one sealant layer is is selected from medium-density polyethylene, low-density polyethylene, or combinations thereof, and the article exhibits Young's modulus less than 500 MPa.

In an embodiment of the present disclosure, there is provided a recyclable article as described herein, wherein the article is a laminate comprising at least two films.

In an embodiment of the present disclosure, there is provided a recyclable article as described herein, wherein the article is a laminate made by extrusion lamination or adhesive lamination of at least two films having at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 50 μm to 260 μm.

In an embodiment of the present disclosure, there is provided a recyclable article as described herein, wherein the article is a laminate made by extrusion lamination or adhesive lamination of at least two films having 5-7 layers made by downward extrusion blown film process comprising the at least one polyethylene having a density in the range of 0.94 to 0.97 g/cm³.

In an embodiment of the present disclosure, there is provided a recyclable article as described herein, wherein the article is a film having 7 layers made by downward extrusion blown film process comprising the at least one polyethylene having a density in the range of 0.94 to 0.97 g/cm³, one or more components selected from linear low-density polyethylene and medium-density polyethylene, having thickness of 90 μm.

In an embodiment of the present disclosure, there is provided a recyclable article as described herein, wherein the article is a laminate made by extrusion lamination/adhesive lamination of at least two films having 7 layers made by downward extrusion blown film process comprising high-density polyethylene having a density in the range of 0.94 to 0.97 g/cm³.

In an embodiment of the present disclosure, there is provided an article as described herein, wherein the article is a laminate made by extrusion lamination or adhesive lamination of at least two films, wherein the film has at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 50 μm to 260 μm.

In an embodiment of the present disclosure, there is provided an article as described herein, wherein the article is a laminate made by extrusion lamination or adhesive lamination of at least two films, and wherein the first film has 5-7 layers made by downward extrusion blown film process comprising the at least one polyethylene having a density in the range of 0.94 to 0.97 g/cm³ and the second film has at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 50 μm to 260 μm.

In an embodiment of the present disclosure, there is provided an article as described herein, wherein the article is a laminate made by extrusion lamination or adhesive lamination of a film with 3 to 7 layers having thickness in the range of 40 μm to 125 μm made by upward extrusion blown film process comprising HDPE, a film having 5-7 layers made by downward extrusion blown film process comprising the at least one polyethylene having a density in the range of 0.94 to 0.97 g/cm³ having a thickness in the range of 50 μm to 250 μm, with the extrusion lamination layer or adhesive lamination layer.

In an embodiment of the present disclosure, there is provided an article as described herein, wherein the article is a laminate made by extrusion lamination of a film with 3 to 7 layers having thickness in the range of 40 μm to 125 μm made by upward extrusion blown film process comprising HDPE, a film having 5-7 layers made by downward extrusion blown film process comprising the at least one polyethylene having a density in the range of 0.94 to 0.97 g/cm³ having a thickness in the range of 50 μm to 250 μm, with the extrusion lamination layer of thickness in the range of 10 μm to 40 μm. In another embodiment of the present disclosure, wherein the extrusion lamination layer is of thickness in the range of 15 μm to 35 μm.

In an embodiment of the present disclosure, there is provided an article as described herein, wherein the article is a laminate made by adhesive lamination of a film with 3 to 7 layers having thickness in the range of 40 μm to 125 μm made by upward extrusion blown film process comprising HDPE, a film having 5-7 layers made by downward extrusion blown film process comprising the at least one polyethylene having a density in the range of 0.94 to 0.97 g/cm³ having a thickness in the range of 50 μm to 250 μm, with the adhesive lamination layer of thickness in the range of 3 μm to 5 μm. In another embodiment of the present disclosure, wherein the adhesive lamination layer is of thickness in the range of 4.5 μm to 5 μm In an embodiment of the present disclosure, there is provided an article as described herein, wherein the article is a laminate made by extrusion/adhesive lamination of a film with 5 layers having thickness of 50 μm made by upward extrusion blown film process comprising HDPE, a film having 5 layers made by downward extrusion blown film process comprising the at least one polyethylene having a density in the range of 0.94 to 0.97 g/cm³ with a thickness of 180μ with, the extrusion lamination layer with a thickness of 20 μm.

In an embodiment of the present disclosure, there is provided an article as described herein, wherein the article is a laminate made by extrusion/adhesive lamination of a film with 5 layers having thickness of 50 μm made by upward extrusion blown film process comprising HDPE, a film having 5 layers made by downward extrusion blown film process comprising the at least one polyethylene having a density in the range of 0.94 to 0.97 g/cm³ with a thickness of 180 μm with the adhesive lamination layer with a thickness of 4.5 to 5 μm.

In an embodiment of the present disclosure, there is provided an article described herein, wherein the article is a laminate made by extrusion/adhesive lamination of a film with 3 to 7 layers having thickness in the range of 40 μm to 125 μm made by upward extrusion blown film process comprising HDPE, a second film made by downward extrusion, and having at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with a thickness in the range of 50 μm to 250 μm with the extrusion/adhesive lamination layer.

In an embodiment of the present disclosure, there is provided an article as described herein, wherein the article is a laminate comprising at least two films, and the laminate is made by extrusion lamination or adhesive lamination of a film with 3 to 7 layers made by upward extrusion blown film process comprising HDPE with thickness in the range of 40 μm to 60 μm, at least two films having at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness in the range of 50 μm to 260 μm, wherein the first and the second films have thickness in the range of 60 μm to 115 μm with a first extrusion/adhesive lamination layer and a second extrusion/adhesive lamination layer.

In an embodiment of the present disclosure, there is provided an article as described herein, wherein the article is a laminate comprising at least two films, and the laminate is made by extrusion/adhesive lamination of a film with 5 layers made by upward extrusion blown film process comprising HDPE with thickness of 50 μm, at least two films having at least 5 layers having printable layer, barrier layer, sealant layer and tie layers, wherein the at least one first tie layer is placed between the at least one printable layer and the at least one barrier layer; and the at least one second tie layer is placed between the at least one sealant layer and the at least one barrier layer, with thickness of 75 μm with a first extrusion/adhesive lamination layer and the second extrusion/adhesive lamination layer.

In an embodiment of the present disclosure, there is provided an article as described herein, wherein the article is a laminate comprising at least two films, and the laminate is made by extrusion/adhesive lamination of a film with 3 to 7 layers made by upward extrusion blown film process comprising HDPE with thickness in the range of 40 μm to 60 μm, at least two films comprising: at least one printable layer; at least one first tie layer; at least one barrier layer; at least one second tie layer; and at least one sealant layer, and wherein the article exhibits Young's modulus less than 700 MPa; and a haze value in the range of 10-50%, with a first extrusion/adhesive lamination layer and a second extrusion/adhesive lamination layer.

In an embodiment of the present disclosure, there is provided an article as described herein, wherein the article is a laminate comprising at least two films, and the laminate is made by extrusion/adhesive lamination of a film with 3 to 7 layers made by upward extrusion blown film process comprising HDPE with thickness in the range of 40 μm to 60 μm, at least two films comprising: at least one printable layer; at least one first tie layer; at least one barrier layer; at least one second tie layer; and at least one sealant layer, and wherein the article exhibits Young's modulus less than 500 MPa; and a haze value in the range of 10-50%, with a first extrusion/adhesive lamination layer and a second extrusion/adhesive lamination layer.

In an embodiment of the present disclosure, there is provided an article as described herein, wherein the article is a laminate comprising at least two films, and the laminate is made by extrusion/adhesive lamination of a film with 5 layers made by upward extrusion blown film process comprising HDPE with thickness of 50 μm, at least two films comprising: at least one printable layer; at least one first tie layer; at least one barrier layer; at least one second tie layer; and at least one sealant layer, and wherein the article exhibits Young's modulus less than 700 MPa, with a first extrusion/adhesive lamination layer and a second extrusion/adhesive lamination layer.

In an embodiment of the present disclosure, there is provided a recyclable article as described herein, wherein the article is a laminate comprising an extrusion/adhesive lamination layer to join the films together and the extrusion/adhesive lamination layer comprises high-density polyethylene, low-density polyethylene, linear low-density polyethylene, medium-density polyethylene, polyurethane, modified polyethylene, or combinations thereof.

In an embodiment of the present disclosure, there is provided a process of preparation of the recyclable article as film as described herein, the process comprising: (a) melting the at least one polyethylene to obtain a polyethylene melt stream; (b) extruding the polyethylene melt downward stream from an annular die to obtain an extruded material; (c) inflating the extruded material to obtain a blown film bubble; and (d) quenching the blown film bubble with chilled water to obtain the recyclable article as film.

In an embodiment of the present disclosure, there is provided a process of preparation of the recyclable article as laminate as described herein, the process comprising: (a) obtaining at least one film by the process of preparation of the recyclable article as film as described herein; (b) obtaining at least one extrusion/adhesive lamination layer; and (c) laminating the at least two films and the at least one extrusion/adhesive lamination layer to obtain a recyclable article as laminate.

In an embodiment of the present disclosure, there is provided an article, wherein the article is a film as described herein made by downward extrusion blown film process, having a density in the range of 0.94 to 0.97 g/cm³, thickness of 200 μm and wherein the article exhibits Young's modulus less than 700 MPa and a haze value less than or equal to 50%.

In an embodiment of the present disclosure, there is provided an article, wherein the article is a film as described herein made by downward extrusion blown film process, having a density in the range of 0.94 to 0.97 g/cm³, thickness of 250 μm and wherein the article exhibits Young's modulus less than 700 MPa and a haze value less than or equal to 50%.

In an embodiment of the present disclosure, there is provided an article, wherein the article is a film as described herein made by downward extrusion blown film process, having a density in the range of 0.94 to 0.97 g/cm³, thickness of 300 μm and wherein the article exhibits Young's modulus less than 700 MPa and a haze value less than or equal to 50%.

In an embodiment of the present disclosure, there is provided an article, wherein the article is a film as described herein made by downward extrusion blown film process, having a density in the range of 0.94 to 0.97 g/cm³, thickness of 350 μm and wherein the article exhibits Young's modulus less than 700 MPa and a haze value less than or equal to 50%.

In an embodiment of the present disclosure, there is provided a use of the article as described herein for a packaging material, wherein the packaging material is selected from lamitube, shoulder barrier liner, and inner barrier liner.

The film or laminate of the present disclosure as described herein, may be transparent, translucent or opaque with haze value in the range of 0-50%.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Abbreviations:
EVOH: ethylene vinyl alcohol
G.S.M: grams per square meter
MD: Machine direction
TD: Transverse direction Example 1

Process of Preparing the Film of the Present Disclosure

Multilayer barrier films were prepared by downward blown film extrusion process, wherein all the layers were prepared by blown film extrusion and then were extrusion laminated to form the multilayer barrier film. The process of film extrusion is a well-known process as discussed in the references [H. F. Guiles Jr., J. R. Wagner Jr., E. M. Mount III, Extrusion The definitive processing guide and handbook, William Andrew Inc, Norwich, N.Y., (2005), 453-463; and T. I. Butler, G. E. Ealer, S. B. Marks, G. D. Oliver, J. Perdikoulias. (eds) Film extrusion manual, 2nd edn. TAPPI (2005)].

Figure 2:
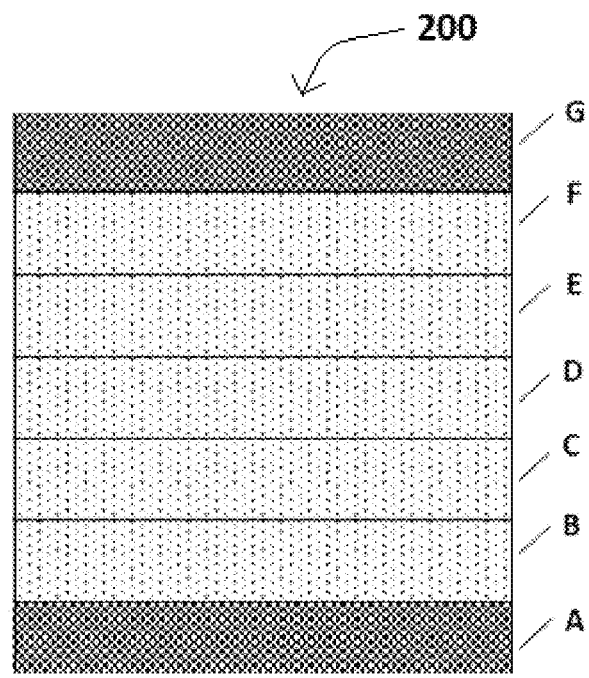
FIG. 2 illustrates a cross-section of a seven-layer normal film-1 (200), according to an implementation of the present disclosure.

For preparing a multilayer barrier film, firstly the polyethylene material was melted to obtain a polyethylene melt stream. This melt stream was forced through an extruder into an annular die to obtain an extruded material which was then inflated by blowing air to form a balloon shape tube. Finally, quenching of the blown film bubble was done using chilled water and a transparent recyclable film was obtained. The film may have 3-11 layers made by downward/upward extrusion blown film process comprising the at least one high-density polyethylene (HDPE) layer. A seven-layer structure is depicted in FIG. 1 and FIG. 2 and elaborated in the forthcoming paragraphs. The prepared films exhibit a haze value of less than or equal to 50%, Young's modulus of less than 700 MPa, and has thickness in the range of 50-360 μm.

Barrier Films

A seven-layer barrier film-1 (100) of the structure: printable layer/HDPE/MDPE/first tie layer/barrier layer/second tie layer/sealant layer was made as shown in FIG. 1. Table 1 depicts the order along as well as the thickness of each layer. The printable layer (A) was the outer layer made of a combination of MDPE and LDPE resins in the weight ratio of 80:20 and having a thickness of 60 μm. Owing to difficult recyclability of EVOH oxygen barrier layer (E), EVOH having a thickness of 15 μm was present in less than 10% by weight of the total film. The sealant layer, 75 μm thick was the inner layer (G) made of a combination of MDPE and LDPE resins in the weight ratio of 80:20. This layer comes in contact with the packaged material. The first tie layer (D) and the second tie layer (F) having thickness 25 μm each were made of maleated polyethylene. The two layers B (HDPE) and C(MDPE) of thickness 25 μm each lie between the outer layer (A) and the first tie layer (D). Thus, the total thickness of the film was 250 μm, with ≤50% haze and <700 MPa Young's modulus.

TABLE 1

250 μm Barrier film - 1 (100)

| Layers | Material | Film thickness | Total μm | Resin weight ratio |
|---|---|---|---|---|
| G Inner | MDPE | 250 | 75 | 80 |
|  | LDPE |  |  | 20 |
| F | Second tie Layer |  | 25 | – |
| E | EVOH |  | 15 | – |
| D | First tie Layer |  | 25 | – |
| C | MDPE(S) |  | 25 | – |
| B | HDPE(S) |  | 25 | – |
| A Outer | LDPE |  | 60 | 20 |
|  | MDPE |  |  | 80 |
| Sub Total: |  | 250 | 250 |  |

A seven-layer barrier film-2, 2i, 3 and 3i were made as illustrated in Tables 2(a-d). 115 μm Barrier film-2 as depicted in Table 2a is explained herein. The printable layer (A) was the outer layer made of a combination of MDPE and LDPE resins in the weight ratio of 80:20 and having a thickness of 25 μm. The EVOH oxygen barrier layer (E) with a thickness of 8 μm was present in less than 10% by width of the total film. The sealant layer was the inner layer (G) made of a combination of MDPE and LDPE resins in the weight ratio of 80:20 and having total a thickness of 40 μm. This layer comes in contact of the packaged material. The first tie layer (D) and second tie layer (F) having thickness 10 μm each were made of maleated polyethylene. The two layers B (HDPE) and C (MDPE) of thickness 11 μm each lie between the outer layer (A) and the first tie layer (D). Thus, the total thickness of the film was 115 μm with ≤50% haze and <700 MPa Young's modulus.

Similarly the 115 μm Barrier film-2i, 140 μm Barrier film-3, 140 μm Barrier film-3i are obtained in a structure as explained in Tables 2b, 2c and 2d respectively.

TABLE 2a

115 μm Barrier film - 2 (100)

| Layers | Material | Film thickness | Total μm | Resin weight ratio |
|---|---|---|---|---|
| G Inner | MDPE | 115 | 40 | 80 |
|  | LDPE |  |  | 20 |
| F | Second tie Layer |  | 10 | – |
| E | EVOH |  | 8 | – |
| D | First tie Layer |  | 10 | – |
| C | MDPE(S) |  | 11 | – |
| B | HDPE(S) |  | 11 | – |
| A Outer | LDPE |  | 25 | 20 |
|  | MDPE |  |  | 80 |
| Sub Total: |  | 115 | 115 |  |

TABLE 2b

115 μm Barrier film - 2i (100)

| Layers | Material | Film thickness | Total μm | Resin weight ratio |
|---|---|---|---|---|
| G Inner | MDPE | 115 | 40 | 80 |
|  | LDPE |  |  | 20 |
| F | Second tie Layer |  | 10 | – |
| E | EVOH |  | 8 | – |
| D | First tie Layer |  | 10 | – |
| C | MDPE |  | 11 | – |
| B | MDPE |  | 11 | – |
| A Outer | LDPE |  | 25 | 20 |
|  | MDPE |  |  | 80 |
| Sub Total: |  | 115 | 115 |  |

TABLE 2c

140 μm Barrier film - 3 (100)

| Layers | Material | Total μm | Resin weight ratio |
|---|---|---|---|
| G Inner | HDPE | 40 | 80 |
|  | LDPE |  | 20 |
| F | Second tie Layer | 14 | – |
| E | EVOH | 7 | – |
| D | First tie Layer | 14 | – |
| C | HDPE(S) | 15 | – |
| B | HDPE(S) | 20 | – |
| A Outer | LDPE | 30 | 20 |
|  | HDPE |  | 80 |
| Sub Total: |  | 140 |  |

TABLE 2d

140 μm Barrier film - 3i (100)

| Layers | Material | Total μm | Resin weight ratio |
|---|---|---|---|
| G Inner | MDPE | 40 | 80 |
|  | LDPE |  | 20 |
| F | Second tie Layer | 14 | – |
| E | EVOH | 7 | – |
| D | First tie Layer | 14 | – |
| C | MDPE(S) | 15 | – |
| B | MDPE(S) | 20 | – |
| A Outer | LDPE | 30 | 20 |
|  | MDPE |  | 80 |
| Sub Total: |  | 140 |  |

Normal Films

A seven-layer normal film-1 and 1i (200) were made by downward blown film extrusion process as shown in FIG. 2. The films were transparent having the structure in Tables 3a-b. 115 μm Normal film-1 is as explained below. The printable layer (A) was the outer layer made of a combination of MDPE and LDPE resins in the weight ratio of 80:20 and having total a thickness of 28 μm. The MDPE layers (B, C, D, and E) and F of 5 HDPE layer were made of 12/11 μm thickness each. The sealant layer (G) was made of a combination of MDPE and LDPE resins in the weight ratio of 80:20 and having total and having a thickness of 28 μm. Thus, the total thickness of the normal film was 115 μm. Similarly 115 μm Normal film-1i was obtained as depicted in Table 3b.

TABLE 3a

115 μm Normal film - 1 (200)

| Layers | Material | Film thickness | Total μm | Resin weight ratio |
|---|---|---|---|---|
| G Inner | MDPE | 115 | 28 | 80 |
|  | LDPE |  |  | 20 |
| F | HDPE |  | 12 | – |
| E | MDPE |  | 12 | – |
| D | MDPE |  | 11 | – |
| C | MDPE |  | 12 | – |
| B | MDPE |  | 12 | – |
| A Outer | LDPE |  | 28 | 80 |
|  | MDPE |  |  | 20 |
| Sub Total: |  | 115 | 115 | 115 |

TABLE 3b

115 μm Normal film - 1i (200)

| Layers | Material | Film thickness | Total μm | Resin weight ratio |
|---|---|---|---|---|
| G Inner | MDPE | 115 | 28 | 80 |
|  | LDPE |  |  | 20 |
| F | MDPE |  | 12 | – |
| E | MDPE |  | 12 | – |
| D | MDPE |  | 11 | – |
| C | MDPE |  | 12 | – |
| B | MDPE |  | 12 | – |

TABLE 3b-continued

115 μm Normal film - 1i (200)

| Layers | Material | Film thickness | Total μm | Resin weight ratio |
|---|---|---|---|---|
| A Outer | LDPE | | 28 | 80 |
| | MDPE | | | 20 |
| Sub Total: | | 115 | 115 | 115 |

A seven-layer normal film-2 was made by downward blown film extrusion process having the structure: printable layer/HDPE+MDPE layers/sealant layer as illustrated in Table 4. The printable layer (A) was the outer layer made of a combination of MDPE and LLDPE resins having a thickness of 20 μm. Each of the layers B, C, D, E, and F were made of a combination of HDPE and MDPE resins in a weight ratio of 1:1 having the total thickness of 10 μm. The sealant layer (G) was made of a combination of MDPE and LLDPE resins having a thickness of 20 μm. Thus, the total thickness of the normal film was 90 μm.

TABLE 4

90 μm Normal film - 2

| Layers | Material | Film thickness (μ) | Resin weight ratio |
|---|---|---|---|
| G inner | MDPE | 20 | 50 |
| | LLDPE | | 50 |
| F | MDPE | 10 | 50 |
| | HDPE | | 50 |
| E | MDPE | 10 | 50 |
| | HDPE | | 50 |
| D | MDPE | 10 | 50 |
| | HDPE | | 50 |
| C | MDPE | 10 | 50 |
| | HDPE | | 50 |
| B | MDPE | 10 | 50 |
| | HDPE | | 50 |
| A outer | MDPE | 20 | 50 |
| | LLDPE | | 50 |
| Sub total | | 90 | |

Comparative Film

An 85 μm film as illustrated in Table 5 was prepared by upward blown film extrusion process for comparison purposes. The inner layer C was 17 μm thick, made of a combination of MDPE and HDPE resins present in the weight ratio of 85:15. The intermediate layer B was 51 μm thick made from a combination of MDPE and HDPE resins in the weight ratio of 15:85. The outer layer A was 17 μm thick made from a combination of LLDPE and HDPE resins in the weight ratio of 90:10. Thus, the total thickness of the normal film was 85 μm. This comparative film was then compared with the normal film-2 for the various mechanical properties.

TABLE 5

85 μm Comparative film

| Layers | Material | Film thickness (μ) | Resin weight ratio |
|---|---|---|---|
| C inner | MDPE | 17 | 85 |
| | HDPE | | 15 |
| B | MDPE | 51 | 15 |
| | HDPE | | 85 |
| A outer | LLDPE | 17 | 90 |
| | HDPE | | 10 |
| Sub total | | 85 | |

Example 2

Testing for Mechanical Properties

The 90μ normal film-2 made by downward film extrusion process and the 85μ comparative film made by upward blown film extrusion process were compared based on a variety of mechanical properties including haze value, stiffness, tear strength, tensile strength, Young's modulus and % strain at break the results for which are present in Table 6.

TABLE 6

| Mechanical Property | Units | Standard test method used | 90μ normal film - 2 (Downward) | 85μ comparative film (Upward) |
|---|---|---|---|---|
| Haze | % | — | 35.27 | 72.34 |
| G.S.M. | g/m² | — | 88.61 | 81.60 |
| Thickness | μm | — | 95.13 | 85.25 |
| Stiffness | mg | TAPPI-T543 | | |
| MD | | | 13.30 | 22.20 |
| TD | | | 18.84 | 27.70 |
| Tear strength | kgf/m | ASTM D1938-06 | | |
| MD | | | 14.73 | 13.10 |
| TD | | | 15.27 | 21.40 |
| Tensile Strength | Mpa | | | |
| MD | | ASTM D-882 | 23.06 | 26.42 |
| TD | | | 23.99 | 28.10 |
| Young's Modulus | Mpa | ASTM D-882 | | |
| MD | | | 489.78 | 979.47 |
| TD | | | 482.59 | 1242.56 |
| Elongation (%) | | | | |
| % Strain @ Break | % | ASTM D-882 | 994.83 | 910.10 |
| MD | | | | |
| TD | | | 1232.80 | 886.18 |

It can be observed from the data illustrated in Table 6 that the 90μ normal film-2 made by downward blown film process exhibits much lower haze value of only 35.27% and has Young's modulus<700 MPa specifically <500 MPa while on the other hand, the 85μ comparative film made by upward blown film process shows very high haze value of 72.34% and Young's modulus>950 Mpa. Despite being thicker, the 90μ normal film-2 exhibits lower stiffness (softness), higher tear strength and higher strain at break in both machine and transverse directions. It also exhibits lesser haze than the comparative film, even though both the films are predominantly made from HDPE resins. Thus, the obtained results clearly indicate superiority of the 90μ normal film-2 prepared by blown film extrusion process in terms improved transparency while maintaining the desired stiffness and elasticity of the film. Though both the films are having substantial percentage of 0.94+g/cc density materials (~78%), there is a huge difference in the properties. The downward blown film exhibits better clarity, softness at the same time recyclablity in HDPE recycling stream.

Example 3

Process of Preparing the Laminate of the Present Disclosure

Various kinds of laminates were prepared comprising at least two films selected from barrier film-1, barrier film-2, normal film-1, or combinations thereof. Extrusion lamination or adhesive lamination processes, well known in the art were followed to prepare such laminates. At least two films obtained from the process described above were combined with or without an extrusion/adhesive lamination layer (20 μm thick) to obtain a transparent/opaque recyclable laminate of the present disclosure. The extrusion/adhesive lamination layer was made from high density polyethylene, low-density polyethylene, linear low-density polyethylene, medium-density polyethylene, polyurethane, modified polyethylene, or combinations thereof. The prepared laminates exhibit a haze value of <50% and have Young's modulus of <700 MPa. The total thickness of the laminate may vary from 50-520 μm.

Three-layer laminates with an extrusion/adhesive lamination layer were made with the following structures:

Laminate 1: (Print Side) 115 μm Normal Film-1/20 μm/115 μm Barrier Film-2 (Sealant) exhibiting 640 MPa (MD)/698 MPa (TD); Haze value 25.2. Tables 2a and 3a illustrates the barrier film-2 and normal film-1 used to obtain the laminate 1.

Laminate 2: 140 μm Normal Film-3/20 μm/140 μm Barrier Film-3 exhibit 625 MPa (MD)/712 MPa (TD) and Haze value 28.9. Tables 7 and 2c illustrate the barrier film-3 and normal film-3 used to obtain the laminate 2.

TABLE 7

140 μm Normal film - 3 (100)

| Layers | Material | Total μm | Resin weight ratio |
|---|---|---|---|
| G Inner | MDPE | 32.5 | 80 |
|  | LDPE |  | 20 |
| F | MDPE | 15 | – |
| E | MDPE | 15 | – |
| D | MDPE | 15 | – |
| C | MDPE | 15 | – |
| B | HDPE(S) | 15 | – |
| A Outer | LDPE | 32.5 | 20 |
|  | MDPE |  | 80 |
| Sub Total: |  | 140 |  |

Laminate 3: 115 μm Barrier Film-2i/20 μm/115 μm Barrier Film-2i exhibit 480 MPa (MD)/512 MPa (TD) and Haze value 25.7. Table 2b illustrates the layered barrier film-2i used to obtain the laminate 3.

Laminate 4: 140 μm Barrier Film-3i/20 μm/140 μm Barrier Film-3i exhibit 481 MPa (MD)/487 MPa (TD) and Haze value 31.6. Table 2d illustrates the layered barrier film-3i used to obtain the laminate 4. The 20 μm thick extrusion/adhesive lamination layer that was made by extrusion/adhesion lamination process was used to tightly pack the polyethylene barrier and normal films of the laminates.

From the above laminates, it can be observed that the laminates 1, and 2 exhibit young modulus less than 700 MPa with haze value less than 35%, and laminates 3 and 4 exhibit young modulus less than 500 MPa with haze value less than 35%. Laminates 1 and 2 were made from barrier films and normal film which comprises a combination of HDPE and MDPE, and has at least one layer of HDPE. The laminates 3 and 4 were made from barrier films and normal films which predominantly comprises MDPE. Hence the combination of the polyethylene and their thickness play a significant role critical in obtaining articles of improved mechanical properties, recyclability and transparency.

Another three-layer laminate was made with the below structure comprising an outer normal upward blown film (200) reduced to 50 μm from 115 μm, a 20 μm extrusion/adhesive lamination layer and an inner 180 μm barrier film-1 (100). The barrier film may be 3-11 multilayered film prepared by downward blown film extrusion process. The laminate exhibits a haze value of ≤50% and has Young's modulus of <700 MPa.

Normal Film-1 (50 μm)/20 μm/Barrier Film-1 (180 μm)

A five-layer laminate was made with the following structure:

Normal Film-1 (50μ)/20 μm/Barrier Film-1 (75 μm)/ 20 μm/Barrier Film-1 (75 μm)

The normal film-1 (200) having a thickness of 50 μm was a transparent outer layer. First barrier film-1 was placed between two extrusion/adhesive lamination layers (20 μm thick) and second barrier film-1 was placed at the inner side of the laminate that comes in contact with the packaged material. Both the barrier films are 75 μm thick prepared by downward blown film process. The resulting laminate article exhibits a haze value of ≤50% and has Young's modulus of <500 MPa.

Blocked barrier blown films may also be formed during the blown film extrusion process wherein two extruded barrier films or normal films, as prepared above may stick together without the extrusion/adhesive lamination layer in between. This results in the formation of a blocked barrier blown film of twice the thickness of the extruded barrier film/normal film. Thus, blocked barrier films of thickness in the range of 100 μm to 520 μm are formed.

Advantages of the Present Disclosure

The above-mentioned implementation examples as described on this subject matter and its equivalent thereof have many advantages, including those which are described.

It is discernible from the above cited examples performed in accordance with the embodiments of the present disclosure, that replacing LDPE based packaging films with majority of HDPE or MDPE films prepared by downward blown film extrusion process provides enhanced transparency i.e., haze value of ≤50%. A reduced Young's modulus from 700-1200 MPa for HDPE/MDPE to less than 700 MPa in the prepared articles indicates desired flexibility and elasticity. Thus, the transparent packaging films and laminate articles of the present disclosure, deriving benefits of using high content HDPE are easily biodegradable, durable and have strong commercial potential to compete with the non-recyclable, less clarity packaging films presently used in the market.

Although the subject matter has been described in considerable detail with reference to certain embodiments thereof, other embodiments are possible. As such, the spirit and scope of the disclosure should not be limited to the description of the embodiments contained herein.

I claim:

1. A recyclable article comprising:
   a film comprising 50-90 wt % of at least one polyethylene having a density in the range 0.94 to 0.97 g/cm$^3$,
   wherein the article exhibits young's modulus less than 700 MPa; and a haze value less than or equal to 50%,
   wherein the at least one polyethylene is selected from the group consisting of high-density polyethylene, medium-density polyethylene, and combinations thereof,
   wherein the film is made by downward blown film extrusion process.

2. The article as claimed in claim 1, wherein the article exhibits young's modulus less than 500 MPa; and a haze value less than or equal to 50%.

3. The article as claimed in claim 1, wherein the film is a multilayer film having 3-11 layers.

4. The article as claimed in claim 1, wherein the article further comprises one or more component selected from high-density polyethylene, low-density polyethylene, linear low-density polyethylene, or medium-density polyethylene.

5. The article as claimed in claim 1, wherein the article comprises UV blocking agent, pigment, functional masterbatch, or combinations thereof.

6. The article as claimed in claim 1, wherein the article has a thickness in the range of 50 µm to 520 µm.

7. The article as claimed in claim 1, wherein the film has 5-7 layers made by downward extrusion blown film process comprising the at least one polyethylene having a density in the range of 0.94 to 0.97 g/cm$^3$.

8. The article as claimed in claim 1, wherein the film comprises:
   at least one printable layer;
   at least one first tie layer;
   at least one barrier layer;
   at least one second tie layer; and
   at least one sealant layer,
   wherein the article exhibits young's modulus less than 700 MPa; and a haze value in the range of 10-50%.

9. The article as claimed in claim 8, wherein the at least one printable layer and the at least one sealant layer is selected from high-density polyethylene, low-density polyethylene, linear low-density, medium-density polyethylene, or combinations thereof; the at least one barrier layer is ethylene vinyl alcohol and the at least one first tie layer and the at least one second tie layer independently comprises a polymeric adhesive selected from the group consisting of maleated polyethylene, anhydride grafted ethylene/1-butene copolymer, anhydride grafted ethylene/1-hexene copolymer, propylene ethylene copolymer, ethylene vinyl acetate copolymer, ethylene methyl acrylate copolymer, anhydride grafted ethylene/1-octene copolymer, modified polypropylene, maleated polypropylene, and combinations thereof.

10. The article as claimed in claim 8, wherein the at least one barrier layer is less than 10% by weight of the total film.

11. The article as claimed in claim 8, wherein the film has at least 5 layers having the at least one first tie layer placed between the at least one printable layer and the at least one barrier layer; the at least one second tie layer is placed between the at least one sealant layer and the at least one barrier layer, and the film has thickness in the range of 50 µm to 260 µm.

12. The article as claimed in claim 7, wherein the film is blocked during a blown film extrusion process having thickness in the range of 100 µm to 520 µm.

13. The article as claimed in claim 1, wherein the article comprises at least two films.

14. The article as claimed in claim 13, wherein the article comprises a laminate made by extrusion lamination or adhesive lamination of at least two films, wherein each film has of the 5-7 layers made by downward extrusion blown film process comprising the at least one polyethylene having a density in the range of 0.94 to 0.97 g/cm$^3$.

15. The article as claimed in claim 13, wherein the article comprises a laminate made by extrusion lamination or adhesive lamination of at least two of the films, wherein each film has at least 5 layers having at least one first tie layer placed between at least one printable layer and at least one barrier layer; at least one second tie layer is placed between at least one sealant layer and the at least one barrier layer, and the film has thickness in the range of 50 µm to 260 µm.

16. The article as claimed in claim 13, wherein the article comprises a laminate made by extrusion lamination or adhesive lamination of the film, wherein the film has 5-7 layers made by downward extrusion blown film process comprising the at least one polyethylene having a density in the range of 0.94 to 0.97 g/cm$^3$ and the film, wherein the film has at least 5 layers having at least one first tie layer placed between at least one printable layer and at least one barrier layer; at least one second tie layer is placed between at least one sealant layer and the at least one barrier layer, and the film has thickness in the range of 50 µm to 260 µm.

17. The article as claimed in claim 13, wherein the article comprises a laminate made by extrusion lamination or adhesive lamination of a film with 3 to 7 layers having thickness in the range of 40 µm to 125 µm made by upward extrusion blown film process comprising HDPE with the film, wherein the film has 5-7 layers made by downward extrusion blown film process comprising the at least one polyethylene having a density in the range of 0.94 to 0.97 g/cm$^3$ or the film, wherein the film has at least 5 layers having the at least one first tie layer placed between at least one printable layer and at least one barrier layer; at least one second tie layer is placed between at least one sealant layer and the at least one barrier layer, and the film has thickness in the range of 50 µm to 260 µm, and an extrusion lamination layer or an adhesive lamination layer.

18. The article as claimed in claim 13, wherein the article comprises a laminate made by extrusion lamination or adhesive lamination of a film with 3 to 7 layers made by upward extrusion blown film process comprising HDPE with thickness in the range of 40 µm to 60 µm, and at least two of the films, wherein each film has 5-7 layers made by downward extrusion blown film process comprising the at least one polyethylene having a density in the range of 0.94 to 0.97 g/cm$^3$ or the film, wherein the film has at least 5 layers having at least one first tie layer placed between at least one printable layer and at least one barrier layer; at least one second tie layer is placed between at least one sealant layer and the at least one barrier layer, and the film has thickness in the range of 50 µm to 260 µm, with a first extrusion/adhesive lamination layer and a second extrusion/adhesive lamination layer.

19. The article as claimed in claim 14, wherein the laminate comprises an extrusion lamination layer or adhesive lamination layer comprising high-density polyethylene, low-density polyethylene, linear low-density polyethylene, medium-density polyethylene, polyurethane, modified polyethylene, or combinations thereof.

20. A lamitube comprising the article as claimed in claim 1.

* * * * *